(12) United States Patent
Baker

(10) Patent No.: US 8,302,104 B2
(45) Date of Patent: Oct. 30, 2012

(54) SESSION PERSISTENCE IN DYNAMIC NODE ALLOCATION COMPUTING ENVIRONMENTS

(75) Inventor: Dennis Baker, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1769 days.

(21) Appl. No.: 11/540,192

(22) Filed: Sep. 29, 2006

(65) Prior Publication Data

US 2008/0104607 A1    May 1, 2008

(51) Int. Cl.
*G06F 9/46* (2006.01)
*G06F 15/16* (2006.01)

(52) U.S. Cl. .................. 718/105; 709/227; 709/229
(58) Field of Classification Search ........... 718/104–105
See application file for complete search history.

(56) References Cited

U.S. PATENT DOCUMENTS

| | | | | |
|---|---|---|---|---|
| 5,303,238 A * | 4/1994 | Brodd et al. | ............ | 370/402 |
| 5,339,415 A * | 8/1994 | Strout et al. | ............ | 718/102 |
| 6,003,082 A * | 12/1999 | Gampper et al. | ............ | 709/225 |
| 6,317,775 B1 * | 11/2001 | Coile et al. | ............ | 709/201 |
| 6,763,520 B1 * | 7/2004 | Seeds | ............ | 718/101 |
| 7,260,644 B1 * | 8/2007 | Shah et al. | ............ | 709/238 |
| 7,277,945 B1 * | 10/2007 | Shah et al. | ............ | 709/226 |
| 7,296,076 B1 * | 11/2007 | Portolani | ............ | 709/227 |
| 7,328,237 B1 * | 2/2008 | Thubert et al. | ............ | 709/203 |
| 7,454,489 B2 * | 11/2008 | Chauffour et al. | ............ | 709/223 |
| 7,774,484 B1 * | 8/2010 | Masters et al. | ............ | 709/229 |
| 2002/0052909 A1 * | 5/2002 | Seeds | ............ | 709/104 |
| 2002/0152307 A1 * | 10/2002 | Doyle et al. | ............ | 709/225 |
| 2002/0194251 A1 * | 12/2002 | Richter et al. | ............ | 709/105 |
| 2003/0046396 A1 * | 3/2003 | Richter et al. | ............ | 709/226 |
| 2005/0005006 A1 * | 1/2005 | Chauffour et al. | ............ | 709/223 |
| 2007/0156869 A1 * | 7/2007 | Galchev et al. | ............ | 709/223 |

* cited by examiner

*Primary Examiner* — Jennifer To

(57) ABSTRACT

Exemplary computer system architectures and methods are described. In some embodiments, a computer network comprises a computing engine including a plurality of compute nodes and a load balancer coupled to the computing engine and including a processor and a memory module. The memory module comprises logic instructions which, when executed by the processor, configure the processor to receive a connection request from a client computing device for computing services provided by one of the compute nodes, obtain, from the connection request, a session identifier associated with the request, and store the session identifier in a memory coupled to the load balancer.

9 Claims, 4 Drawing Sheets

| Session ID | Host IP Address | Connecting Server IP Address | Server Pool ID | Compute Node ID | Connection Duration |
|---|---|---|---|---|---|
| 000001 | 1.160.55.210 | 1.62.55.5 | 52 | 015 | X sec |
| 000010 | 1.136.105.155 | 1.66.224.48 | 64 | 011 | X sec |
| 000011 | 155.44.55.151 | 155.87.22.6 | 52 | 022 | X sec |
| 100011 | 22.43.55.257 | 1.82.75.6 | 64 | 325 | X sec |

SESSION PERSISTENCE IN DYNAMIC NODE ALLOCATION COMPUTING ENVIRONMENTS

BACKGROUND

Computing networks may be populated with servers and client computers. Servers are generally more powerful computers that provide common functions such as record sharing and Internet access to the client computers. Client computers may be fully functional computers, each having a processor, hard drive, CD ROM drive, floppy drive and system memory.

Recently, thin client computing devices have become more popular among IT organizations. Compared to fully functional client computers, thin clients may have only a relatively small amount of system memory and a relatively slow processor. However, thin clients provide several advantages over fully functional client computers. For example, thin clients may be more reliable than their fully functional client computers, which in turn reduces maintenance costs.

Thin clients may be connected over a network to a central server. The thin client computer may communicate with the central server via a multi-user terminal server application program. The central server may provide a virtualized operating system for the thin clients connected to it. Additionally, the central server may supply application programs such as, e.g., word processing or Internet browsing to the thin clients. A user's data such as, e.g., document files, spreadsheets and Internet favorites, may be stored on the central server or network storage device coupled to the central server. Thus, when a thin client breaks, it may be easily removed and replaced without the need to restore the user's programs and data such as with a traditional fully functional client computer.

Problems may arise when a user of a thin client connected to a central server through a multi-user terminal server application begins execution of a process that requires a relatively large amount of computing power. For example, if the central server is unable to effectively distribute the computing load required by the process, then other thin client users connected to the central server through the terminal server application may experience performance problems because a significant portion of the power of the central server is being diverted to process the needs of a single user.

A central server may contain one or more blade computers such as, e.g., the Proliant BL e-Class product line available from the assignee of the present application, which are ultra-dense, low power blade computers designed to provide a high level of computing power in a relatively small space. In some applications hundreds of blade computers may be mounted in a single rack.

Because blade computers consume less space, power, and produce less heat than conventional rack-mounted computers, they may result in significant cost savings. Additionally, blade computers may be connected in parallel to form computing engines of immense power. An effective way to employ blade computers in a network architecture is desirable.

BRIEF DESCRIPTION OF THE DRAWINGS

FIG. 4 is a schematic illustration of one embodiment of a data table.

DETAILED DESCRIPTION

Described herein are exemplary computing environment architectures and methods for session persistence in dynamic node allocation computing environments. The methods described herein may be embodied as logic instructions on a computer-readable medium. When executed on a processor, the logic instructions cause a computing device to be programmed as a special-purpose machine that may implement the described methods. The processor, when configured by the logic instructions to execute the methods recited herein, constitutes structure for performing the described methods.

Figure 1:
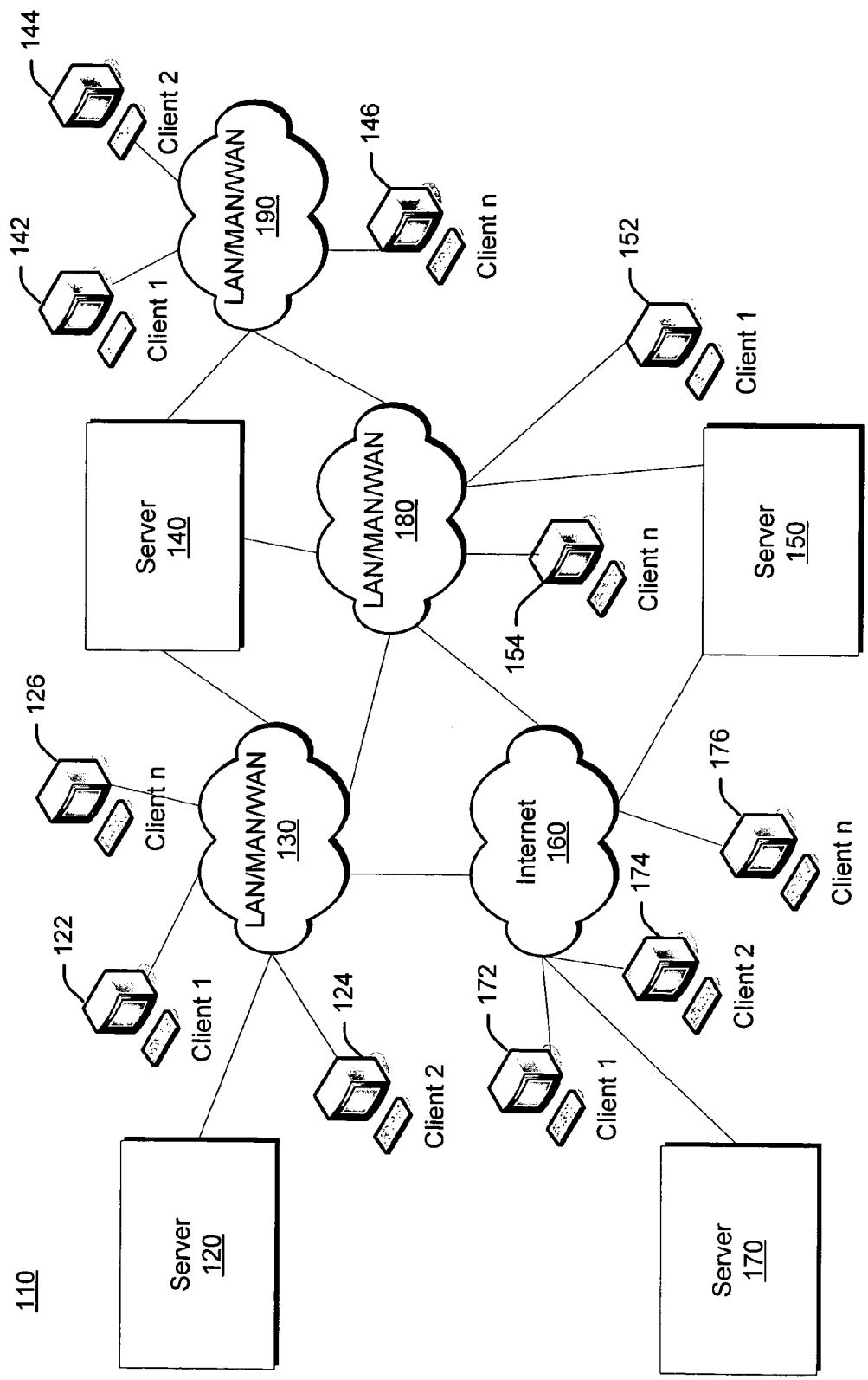
FIG. 1 is a block diagram of a client-server computer network architecture in which embodiments may be used to advantage.

FIG. 1 is a schematic illustration of a block diagram of a computer network 110. The computer network 110 is intended to illustrate a conventional client-server network configuration. A server 120 is connected to a plurality of fully functional client computers 122, 124 and 126 via a communication network 130 such as a Local Area Network (LAN), Metropolitan Area Network (MAN) or a Wide Area Network (WAN) or the like.

The server 120 may be connected to a plurality (n) client computers. Each client computer in the network 110 may be implemented as a fully functional client computer or as a thin client computing. The magnitude of n may be related to the computing power of the server 120. If the server 120 has a high degree of computing power (for example, fast processor(s) and/or a large amount of system memory) relative to other servers on the network, it will be able to effectively serve a relatively large number of client computers.

The server 120 is connected via a network infrastructure 130, which may comprise any combination of hubs, switches, routers and the like. While the network infrastructure 130 is illustrated as being either a LAN, WAN, or MAN, those skilled in the art will appreciate that the network infrastructure 130 may assume other forms such as, e.g., the Internet or any other intranet. The network 110 may include other servers and clients, which may be widely dispersed geographically with respect to the server 120 and to each other to support fully functional client computers in other locations.

The network infrastructure 130 connects the server 120 to server 140, which is representative of any other server in the network environment of server 120. The server 140 may be connected to a plurality of client computers 142, 144 and 146 over network 190. The server 140 is additionally connected to server 150 via network 180, which is in turn is connected to client computers 152 and 154 over network 180. The number of client computers connected to the servers 140 and 150 is dependent on the computing power of the servers 140 and 150, respectively.

The server 140 is additionally connected to the Internet 160 over network 130 or network 180, which is in turn, is connected to server 170. Server 170 is connected to a plurality of client computers 172, 174 and 176 over Internet 160. As with the other servers shown in FIG. 1, server 170 may be connected to as many client computers as its computing power will allow.

Those of ordinary skill in the art will appreciate that servers 120, 140 150 and 170 need not be centrally located. Servers 120, 140, 150 and 170 may be physically remote from one another and maintained separately. Many of the client computers connected with the network 110 have their own CD- ROM and floppy drives, which may be used to load additional software. The software stored on the fully functional client computers in the network 110 may be subject to damage or misconfiguration by users. Additionally, the software loaded by users of the client computers may require periodic maintenance or upgrades.

Figure 2:
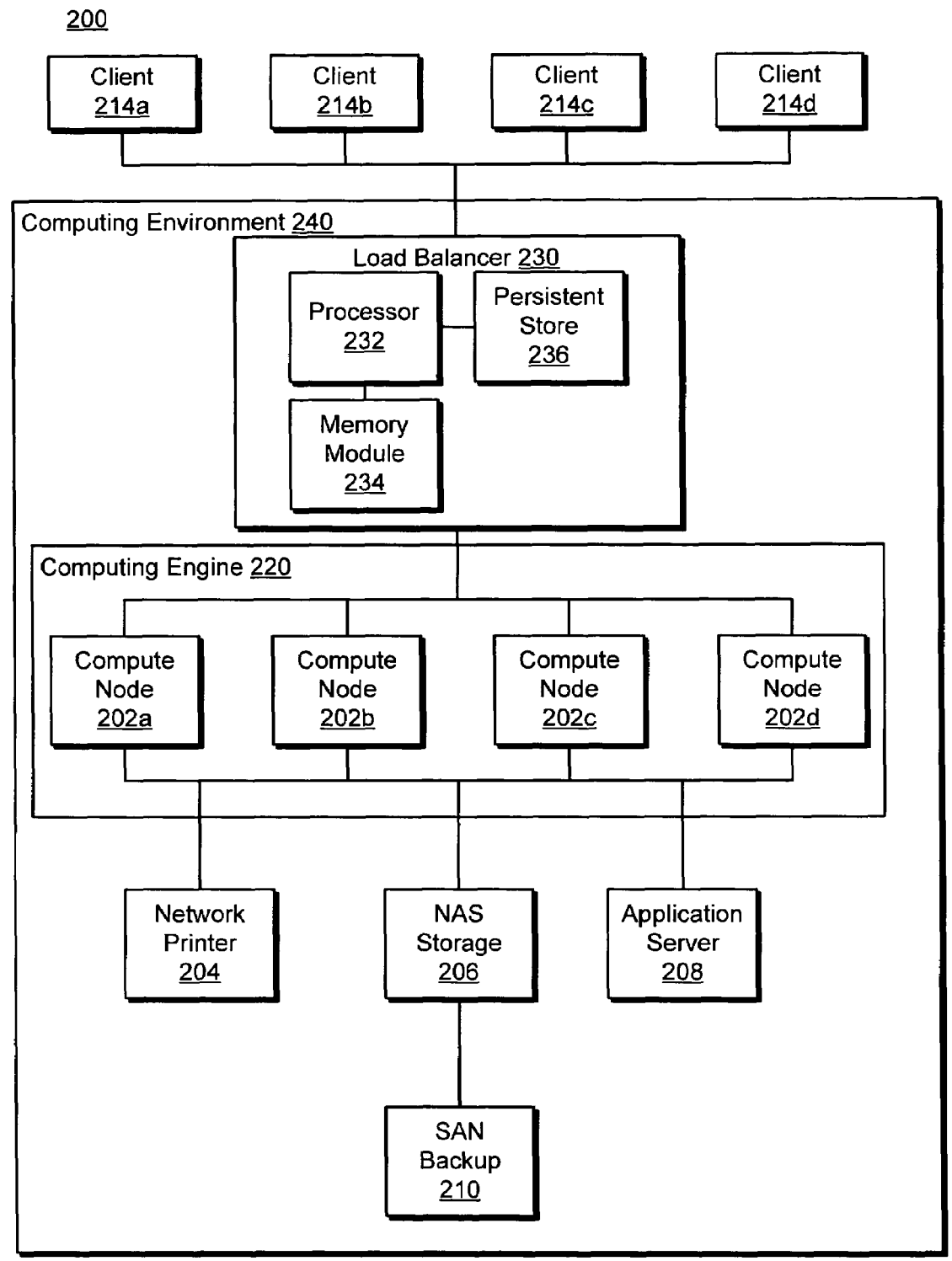
FIG. 2 is a block diagram of an example of a network architecture according to embodiments.

FIG. 2 is a block diagram of an example of a computer network architecture. The network architecture is referred to generally by the reference numeral 200. In one embodiment, a plurality of client computing devices 214a-214d are coupled to a computing environment 240 by a suitable communication network.

Within computing environment 240 a plurality of compute nodes 202a-202d are coupled to form a central computing engine 220. Compute nodes 202a-202d may be referred to collectively by the reference numeral 202. Each compute node 202a-202d may comprise a blade computing device such as, e.g., an HP bc1500 blade PC commercially available from Hewlett Packard Corporation of Palo Alto, Calif., USA. Four compute nodes 202a-202d are shown in the computing environment 240 for purposes of illustration, but compute nodes may be added to or removed from the computing engine as needed. The compute nodes 202 are connected by a network infrastructure so that they may share information with other networked resources and with a client in a client-server (or a terminal-server) arrangement.

The compute nodes 202 may be connected to additional computing resources such as a network printer 204, a network attached storage device 206 and/or an application server 208. The network attached storage device 206 may be connected to an auxiliary storage device or storage attached network such as a server attached network back-up device 210.

The compute nodes 202 are additionally connected to a load balancer 230. In one embodiment, the load balancer 230 may be implemented as a BIG-IP Blade Controller, commercially available from F5 Networks of Seattle, Wash., USA.

In one embodiment, load balancer 230 comprises a processor 232, a memory module 234, and a persistent memory store 236. The processor 232 may further comprise random access memory (RAM) and/or random operational memory (ROM), or other kinds of volatile or non-volatile memory, or some combination thereof. The persistent memory store 236 may be implemented as magnetic storage such as a hard disk drive, optical storage such as a CD-ROM or a DVD-ROM, or some combination of these and other persistent memory devices.

In the embodiment depicted in FIG. 2, the load balancer 230 may be a network traffic load balancer configured to direct (i.e., allocate) certain types of network traffic to the plurality of compute nodes 202. The load balancer 230 may be connected to a plurality of client computers 214 and may be adapted to receive network traffic, including requests to perform computing services then logically track and dynamically direct these connections to one or more compute nodes.

The load balancer 230 may distribute (allocate) requests for computing services among the compute nodes 202 according to any protocol or algorithm. A use-based distribution algorithm is one example of a distribution scheme that may be used by the load balancer 230 to distribute requests for computing services to the compute nodes 202. In a use-based distribution scheme, the load balancer 230 may have the capability to communicate with the compute nodes 202 to determine the relative workload being performed by each of the compute nodes 202. Requests for additional work may be forwarded to a compute node that is under-utilized compared to other compute nodes.

The client computers 214 may comprise thin client computer systems. The load balancer 230 may be coupled to the client computers through a single-user terminal server program such as the single-user terminal server utility that is provided as part of the Microsoft Windows XP operating system, which is available from Microsoft Corporation of Redmond, Wash.

In some embodiments, the load balancer 230 comprises a processor 232, a memory module 234, and a persistent memory store 236. The processor 232 may be implemented as a computer processor. The memory module 234 may be implemented as an operating memory, i.e., random access memory (RAM) and/or random operational memory (ROM). The persistent memory store 236 may be implemented as a RAM or as magnetic storage medium such as a hard drive disk or an optical storage medium such as a CD-ROM or a DVD-ROM.

In the embodiment depicted in FIG. 2, the load balancer 230 may be a network traffic load balancer configured to direct (i.e., allocate) certain types of network traffic to the plurality of compute nodes 202. The load balancer 230 may be connected to a plurality of client computers 214 and may be adapted to receive network traffic, including requests to perform computing services then logically track and dynamically direct these connections to one or more compute nodes.

The load balancer 230 may distribute (allocate) requests for computing services among the compute nodes 202 according to any protocol or algorithm. A use-based distribution algorithm is one example of a distribution scheme that may be used by the load balancer 230 to distribute requests for computing services to the compute nodes 202. In a use-based distribution scheme, the load balancer 230 may have the capability to communicate with the compute nodes 202 to determine the relative workload being performed by each of the compute nodes 202. Requests for additional work may be forwarded to a compute node that is under-utilized compared to other compute nodes.

The client computers 214 may comprise thin client computer systems. The load balancer 230 may be coupled to the client computers through a single-user terminal server program such as the single-user terminal server utility that is provided as part of the Microsoft Windows XP operating system, which is available from Microsoft Corporation of Redmond, Wash.

In some embodiments, the computing environment 240 may be adapted to dynamically allocate processing tasks to compute nodes in the computing engine 220. By way of example, client computing device 214a may initiate a connection request for services from one or more of the compute nodes 202. The connection request is received at the load balancer 230, which selects the first compute node, e.g., 202a to which the connection request may be directed. In the event that the connection between the client 214a and the first compute node 202a is disrupted due to, e.g., a network failure, device failure, or the client manually closes the connection, the load balancer 230 may assign the client 214a to a different compute node, e.g., 202b when the client 214a attempts to reconnect. The compute node 202b to which the client is assigned may not have access to information generated during the session that was interrupted. This is because the load balancer 230 may lack the logic to know to which compute node client 214a had been originally directed.

The structure and operations of computing environment 240 address this issue. In some embodiments, the memory module 234 of load balancer 230 includes logic instructions which, when executed by processor 232, cause the processor to create and maintain a data record in persistent store 236 or memory module 234. The data record associates a session identifier received in a connection request with an identifier that identifies the computer node (e.g., 202a) to which the connection request is assigned by the load balancer 230. In the event that a connection is severed, connection information stored in the data file may be used by the load balancer 230 to reconnect the client 214a to the compute node 202a instead of compute node 202b. Additionally, by querying the connection information stored in the data file, the load balancer 230 tracks which compute nodes have existing session identifiers and may avoid directing users to compute nodes that are hosting other user sessions.

Figure 3:
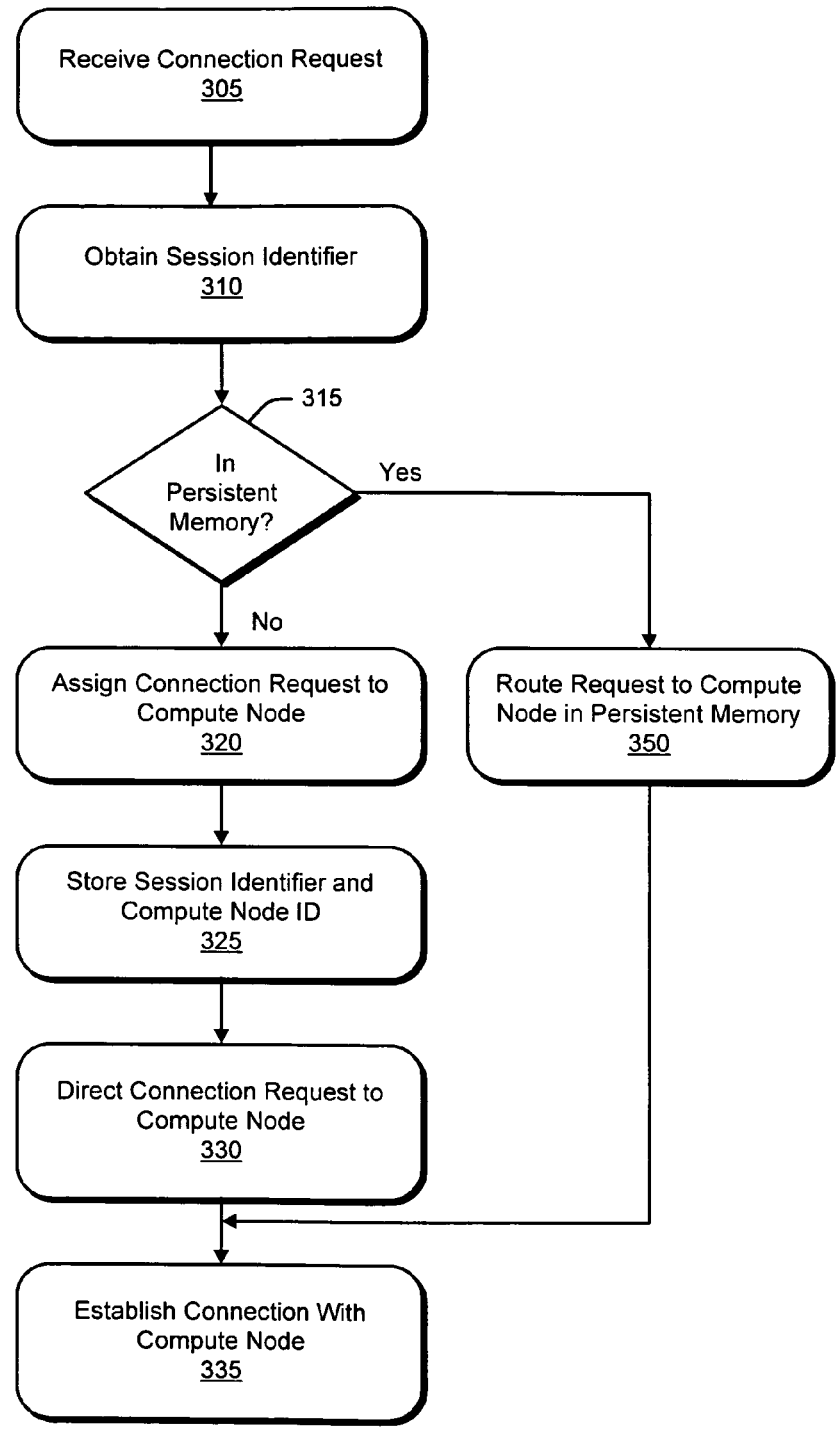
FIG. 3 is a flowchart illustrating operations in an embodiment of a method for implementing user persistence in a dynamic node allocation computing environment.

FIG. 3 is a flowchart illustrating operations in a method for implementing compute node session persistence in a dynamic node allocation computing environment. FIG. 4 is a schematic depiction of some embodiments of a data table. Referring to FIGS. 3-4, at operation 305 a connection request is received from a client computing device such as one of the thin client computing devices 214. The connection request includes a session identifier. In some embodiments, the session identifier may be embodied as a user name identifier which uniquely identifies a user of client 214. In an alternate embodiment, the session identifier may be embodied as a connection request identifier that uniquely identifies a connection request. A connection request identifier may be embodied as, e.g., a sequential identifier assigned by the load balancer 230 when a connection request is received 305 or any other identifier unique to user of the client 214.

At operation 310 the session identifier is obtained, e.g., by parsing the identifier from the connection request or by generating a connection identifier in the load balancer 230. At operation 315 it is determined whether the session identifier is in the data record maintained in the persistent memory store 236 or memory module 234.

Referring to FIG. 4, the record depicted in FIG. 4 may be configured as a data table that associates a session identifier with a compute node ID that identifies the compute node to which the session is assigned. In some embodiments, the data table 400 may include a column for a session identifier, the host IP address of the client, the IP address of the virtual server through which the client connected to the computing environment 240, the pool ID of the computing environment 240, a compute node ID, and a connection duration time. To determine whether the session identifier is in the data table 400, the data table 400 may be searched for a session identifier that matches the session identifier obtained in operation 310.

If, at operation 350, the session identifier is in the persistent memory module 400, then control passes to operation 350 and the connection request is routed to the compute node identified by the compute node ID associated with the session identifier in the table 400.

By contrast, if at operation 315 the session identifier is not in persistent memory, control passes to operation 320 and the connection request is assigned to a compute node. In some embodiments, the load balancer considers as eligible only those compute nodes which have no persistence records stored in the data record. At operation 325 the session identifier and the compute node ID are stored, e.g., in the data table 400. At operation 330 the connection request is directed to the compute node 202 to which it was assigned, and at operation 335 a connection is established between the client and the compute node 202.

The operations of FIG. 3 enable the load balancer 230 to create and maintain a data table 400 that persistently tracks connection information, uses the table to ensure that severed connections are reconnected, and depending on rules of user to compute node ratio, prevents non-persistent users from allocating other persistent compute nodes they themselves are not persistent to. If the user to compute node ratio is greater than one to one, then each compute node may contain up to two or more uniquely persistent clients.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. A method, comprising:
receiving, in a load balancer, a connection request from a client computing device for computing services provided by a number of compute nodes;
obtaining a session identifier associated with the connection request;
storing the session identifier in a memory coupled to the load balancer;
receiving, in the load balancer, a second connection request for a second client computing device;
querying said memory to identify which of the compute odes have existing session identifiers stored in said memory; and
not sending said second connection request to any compute node that is hosting an existing user session as determined by existing session identifiers stored in said memory,
in which, if a user-to-compute node ratio is greater than one-to-one, assigning to at least one of the compute nodes at least two uniquely persistent client computing devices from which the computing nodes will receive connection requests.

2. The method of claim 1, further comprising:
assigning the connection request to a compute node;
storing a compute node identifier in the memory in association with a corresponding session identifier.

3. The method of claim 2, further comprising establishing a connection between the client computing device and the compute node.

4. The method of claim 3, further comprising:
receiving, in the load balancer, a second connection request from the client;
retrieving, from the memory, the compute node identifier associated with that client; and
reconnecting the client to the compute node identified by the compute node identifier.

5. The method of claim 2, further comprising:
terminating a connection between the client computing device and the compute node; and
deleting the association between the compute node identifier and the session identifier in the memory.

6. The method of claim 1, wherein storing the session identifier in a memory coupled to the load balancer comprises storing a session identifier that uniquely identifies a user.

7. The method of claim 1, wherein storing the session identifier in a memory coupled to the load balancer comprises storing a session identifier that uniquely identifies a connection request.

8. The method of claim 1, wherein the session identifier is generated by the client computing device submitting the connection request.

9. The method of claim 1, wherein obtaining the session identifier from the connection request comprises generating the session identifier with the load balancer in response to receipt of, and in association with, the connection request.

* * * * *

UNITED STATES PATENT AND TRADEMARK OFFICE
CERTIFICATE OF CORRECTION

| | |
|---|---|
| PATENT NO. | : 8,302,104 B2 |
| APPLICATION NO. | : 11/540192 |
| DATED | : October 30, 2012 |
| INVENTOR(S) | : Dennis Baker |

Page 1 of 1

It is certified that error appears in the above-identified patent and that said Letters Patent is hereby corrected as shown below:

In the Claims:

In column 6, line 16, in Claim 1, after "request;" insert -- and --.

In column 6, line 22, in Claim 1, delete "odes" and insert -- nodes --, therefor.

Signed and Sealed this
Thirtieth Day of April, 2013

Teresa Stanek Rea
*Acting Director of the United States Patent and Trademark Office*